J. HEYGEL.
Smut Machine.
No. 2,270.
2 Sheets—Sheet 1.
Patented Sept. 25, 1841.
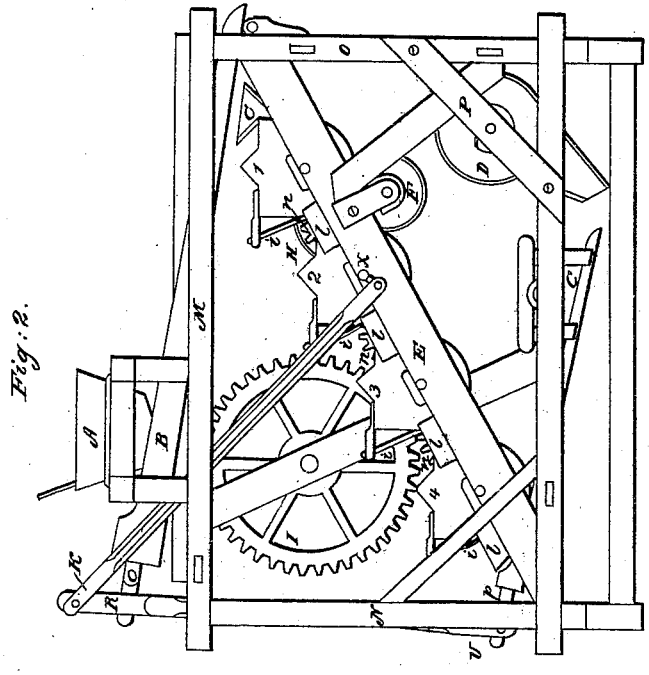
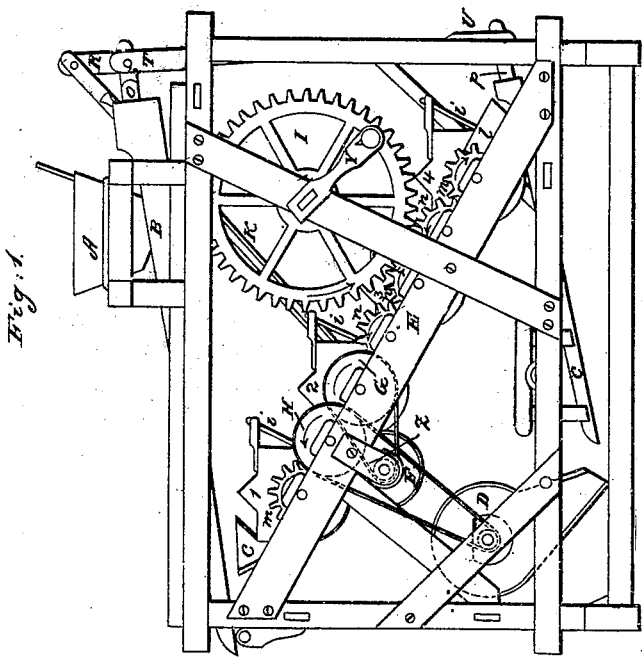

J. HEYGEL.
Smut Machine.
No. 2,270.
2 Sheets—Sheet 2.
Patented Sept. 25, 1841.
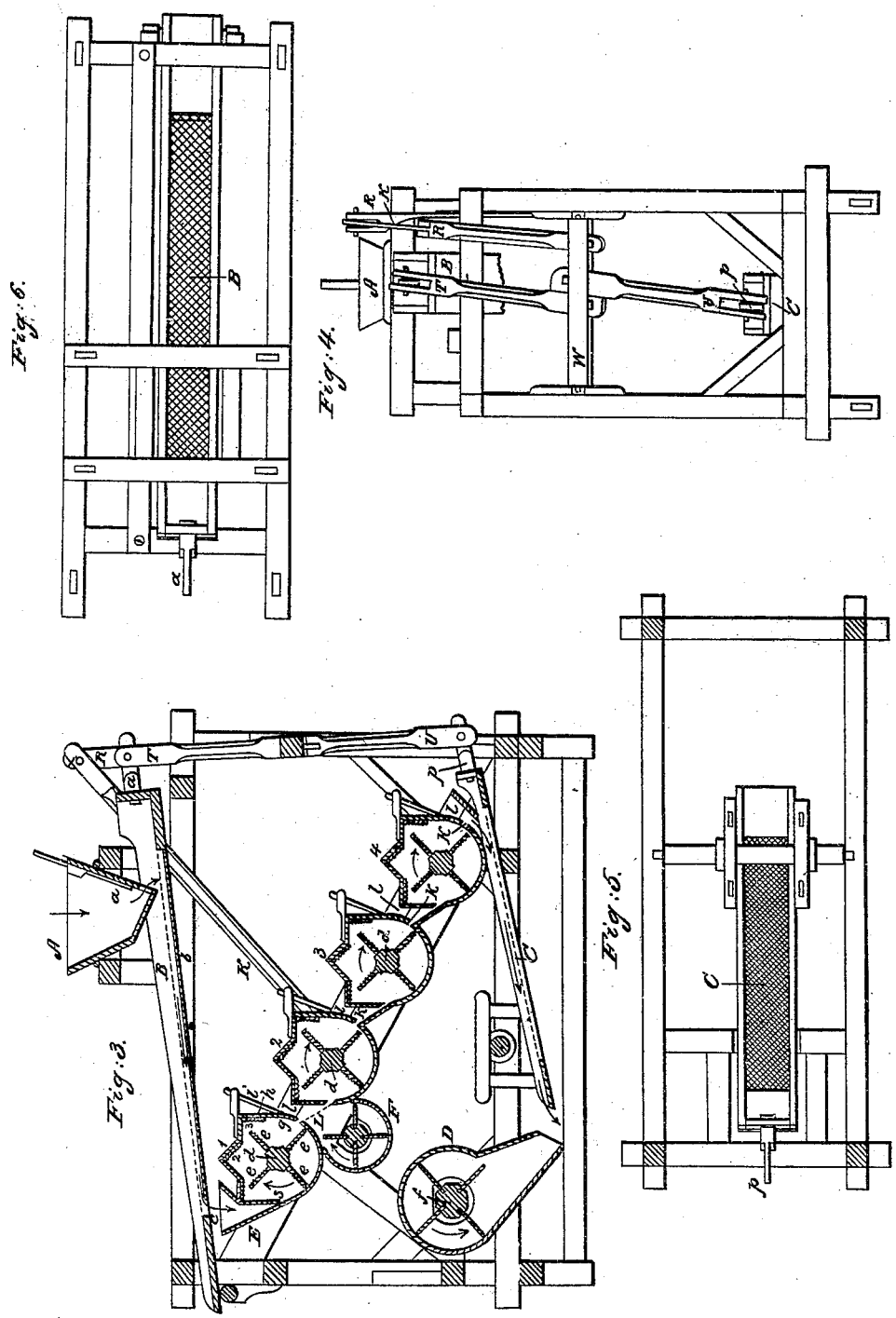

UNITED STATES PATENT OFFICE.

JOSEPH HEYGEL, OF SALISBURY, PENNSYLVANIA.

MACHINE FOR CLEANING AND SEPARATING GARLIC, &c., FROM GRAIN.

Specification of Letters Patent No. 2,270, dated September 25, 1841.

*To all whom it may concern:*

Be it known that I, JOSEPH HEYGEL, of Salisbury, Somerset county, Pennsylvania, have invented an Improvement in Machines for Extracting Garlic from Wheat; and I do hereby declare that the following is a full and exact description, reference being had to the annexed drawings, making a part of this specification.

The nature of my invention consists in constructing a series of concaves on an inclined plane, provided with oblique metallic plates, on which teeth in the form of those of a rasp are cut, in each of which concaves a winged wheel revolves provided with metallic plates with teeth cut inversely to those on the first named plates—which propel the wheat and garlic with great velocity against the oblique plates, the teeth of which oblique plates pierce and break the garlic into small particles when being much smaller and lighter than the grains of wheat, that a sieve and fan wheel readily separates it therefrom.

To enable others skilled in the art to make and use my invention, I will proceed to describe its construction and operation.

The same letters in the several figures in the accompanying drawing refer to the same parts of the machine.

Figure 1, represents a front elevation of the machine. Fig. 2, a back elevation. Fig. 3, a longitudinal vertical section. Fig. 4, is an end view.

A, Fig. 1 is a hopper into which the wheat is to be thrown, from whence it falls into the sieve B, from thence it falls into the hopper $c$. Then it passes all the boxes marked 1, 2, 3, and 4; then falls into the sieve C. The hopper A is made in the common form of hoppers to mills. On the inside of the hopper is placed a gate $a$, which shuts off the passage of the wheat on to the fan until the machine is set in motion. This gate is made of a piece of board of a nearly square form with a rod extending upward from it through a cleat screwed on the inside of the left side of the hopper. The sieve B, is an oblong frame of 7 ft. 3 ins. length and 10 ins. width, with wire crossed at right angles and fastened at each side leaving interstices of sufficient size to permit the wheat to fall through, while at the same time it screens it from tufts of garlic and lumps of dirt which it conveys off at the end of the machine; the wheat falls through the sieve B on board $b$, placed underneath the sieve and closed at the sides, which conducts the wheat to hopper $c$; hopper $c$, consists of two triangular pieces of board of the form shown in the drawing, for end pieces with side pieces screwed to their edges of 8 inches length, the upper opening of the hopper being about 8 inches length and about 7 ins. width; and the lower about 8 inches length and half an inch in width. The sieve C, is an oblong frame 5 feet length and 10 ins. width, with wire crossed and fastened at each side leaving interstices not large enough to let the wheat through, but only to let the broken garlic through: this sieve also conducts the wheat to the fanwheel D, which as the wheat falls from the sieve blows the remaining particles of garlic from the wheat.

The boxes Nos. 1, 2, 3, and 4 are all of the same form and construction. The diameter of these boxes is 14 ins. and length 10 inches. In the center of each are shafts $d$, $d$, $d$, $d$, 4 inches in diameter made of wood. $e$, $e$, $e$, $e$, in box No. 1, are four wings which are tenoned to the shaft $d$, through which tenons screws are placed and are 7¾ inches length 4 inches broad and one-fourth of an inch thick, made of iron or steel and are cut with teeth like those of a rasp, and cut with a stamp one-eighth of an inch broad. These boxes are made of oak; two heads are made of the form of the ends of the boxes, represented at Fig. 3, whose horizontal diameter is 14 inches, pieces of oak 10 inches long are then screwed at their ends to these heads, all around the heads, thus forming the box. At 1', 2', 3' are planes, made by elbows in the concave, which planes form right angles with their adjacent planes: these planes are at an angle of about 45° from a line drawn from the point of the angle, to center of the axis of the winged wheel within the boxes. On these planes are screwed three plates of iron or steel 8 inches long 2 inches broad and one-fourth inch thick, with teeth cut in them in the form of those cut on a rasp, and which teeth are cut in an inverse direction to those on the wings, and are cut with a stamp one-eighth of an inch broad. When the wings revolve they throw the wheat and garlic with great velocity around, and the latter being brought forcibly in contact with the toothed plates 1, 2, 3, is cut by them and broken. The wheat is turned around in each box from 30 to 36 times making in all the four boxes from 120 to 144 times, and goes through seven successive operations from its first entering the machine, until it reaches the fanwheel D viz: First, the wheat goes through the sieve B, which screens it from large tufts of garlic and lumps of dirt; second, it goes through box No. 1, the cutters of which separate the hulls from the garlic, rendering the garlic capable of being pierced and broken by the remaining boxes; third, it receives in passing from box No. 1 to box No. 2 on the sieve L to be described hereafter, the action of fanwheel F arranged below said sieve which blows out the hulls separated by box No. 1, and thus prevents its clogging and obstructing the action of the remaining three boxes.

The fourth, fifth, and sixth, operations, are: It goes through the boxes Nos. 2, 3, and 4 each of which successively throws the garlic with great velocity, and it being thrown tangentially the grains impinge at the point of impact nearly in a right line with the teeth of the oblique plates, which teeth in plate No. 2, stand nearly in a horizontal position, and the garlic being thrown in a horizontal line on that plate, the grains thereof not only receive the full force of the concussion, but receive it nearly on a line with the teeth, which therefore pierce and break them, whereas in a continuous or uniform concave, points or teeth would only receive the grains sidewise and would scratch but not pierce and break them; the undersigned having tried every construction of concave except this ineffectually; seventh operation, is that of sieve C, which by its vibration, sifts out the broken garlic, and at the same time by its inclined position conveys the wheat along to receive the action of fanwheel D.

If notwithstanding all these operations, still some garlic remains in the wheat, it will be thrown out as it falls from sieve C by the fanwheel D. Fanwheel D consists of a shaft $f$, with four wings. It is placed in a box, with an opening below the shaft at each end to admit the air, and a spout at the bottom for the outlet of the current of air, the end of which is placed about 5 inches from the end of sieve C. The course of the wheat through the hoppers sieves and boxes is shown on the drawing by arrows,—and the direction in which the wheels revolve is also shown by arrows.

S Fig. 3, box No. 1, is the orifice of the entrance of the wheat into the box, which orifice is made the entire length of the box. Above the level of this orifice on the opposite side of the box a yielding portion of the side $g$ is attached with a hinge of leather $h$, to the upper portion of the side, and a spring $i$ made of oak presses against this portion of the concave thus made yielding, and keeps it to its place, except when the box is clogged from the wheat flowing faster into the box than it flows out; it then yields and permits the passage of the wheat. This spring is made of oak, of an elbow form, the upper part of 7 inches length, the end is screwed to the top of the left side of the box projecting from it nearly horizontally, and at the end of it another piece of oak for the spring of 7 inches length 1 inch width is joined extending downward nearly at an angle of 45°, its lower end pressing against the hinged piece.

At E, on Fig. 1, is shown an inclined plane which supports the boxes, which are arranged on it at a distance of 17 inches from center to center of shafts which pass through said boxes. This inclined plane consists of two parallel beams between which the boxes are permanently fixed, also the troughs K K see Fig. 3 between boxes 2, 3, and 4 and the sieve L between box No. 1 and 2 hereafter described; the troughs K K as well as the sieve L connect the boxes from their lower front part to the lower back part, and whereby the grain is enabled to pass from one box into the other, the arrangement is as follows; between the boxes Nos. 1 and 2 is placed sieve L, between Nos. 2 and 3 a trough K and between Nos. 3 and 4 a trough K, from box No. 4 the grain falls upon sieve C. The relation of the inclined plane to the boxes is that while it is a support to the boxes, and to the inclined troughs from one box to the other, it permits the wheat to remain a sufficient time in passing through the boxes to be fully acted on the boxes, and its inclination causes the wheat to fall from the upper boxes to the lower—which a horizontal plane would not do, and vertical beams or supports would cause the grain to fall too quickly from one to the other before fully acted upon by the cutters, the inclined plane at the same time admits of the more compact and convenient arrangement of the sieves and the several parts of the machine.

In the course of the grain passing down it passes through box No. 1, which cuts the hull from the garlic, and it is forced out by box No. 1, or to sieve L shown by dotted line between boxes Nos. 1 and 2 (Fig. 3,) and at the same time through this sieve and the stream of wheat passing over it, a current of air is propelled upward by fanwheel F blowing out the hull of the garlic. Thus the action of box No. 1 sieve L and fanwheel F are combined to separate the hull entirely from the garlic. The fanwheel F, consists of a shaft resting on support Z, with four wings. It is covered by a box with an opening at each end below the shaft to admit the air of about 4 inch diameter, and another opening at the top for the outlet of the current of air received by it. G is a band wheel, placed on the shaft of box No. 2, turns the same way as the cutters, and propels the fanwheel F, by a band placed over it, and the shaft of the fanwheel F.

H is a band wheel which by a band placed over it and the shaft of fanwheel D, propels fanwheel D. This band wheel is placed on the shaft of the cog wheel between boxes Nos. 1 and 2.

The sieve L is arranged at an angle of about 60° between boxes Nos. 1 and 2 the edge of the sieve rests against the lower front part of box No. 1, and its lower edge resting against the lower back part of the box No. 2. This sieve consists of a frame of 10 inches in length, 8 inches in width, with wire crossed at right angles, and fastened at each side leaving interstices not large enough to let the wheat through. While the wheat is passing from box No. 1 to box No. 2, the fanwheel F propels the current of air through it, and sieve L, by its interstices permits the current of air to pass through, and at the same time affords a support on which the wheat passes from box No. 1 to box No. 2. The wheat is prevented from spilling at the sides of the troughs between the boxes by small pieces of wood $l, l, l, l$, Fig. 2, placed at the sides thereof.

On the shaft of each box is a cog wheel $m, m, m, m$, and between the first and second, second and third, and third and fourth cog wheels three others $n, n, n$, in order to cause the cutters to revolve in the same direction. The whole machine is driven by a large cog wheel I placed above boxes Nos. 3 and 4, which drives cog wheel $m'$, which cog wheel being connected with the remaining cogwheels, communicates motion to the whole machine. On the shaft of the large cog wheel I, is a crank Y, to give motion to the machine, or when placed in a mill, a drum and band is substituted.

On the shaft of the box No. 2, on the opposite side where its small cogwheel $m$ is placed, is a small crank $x$ attached to said shaft, this crank $x$ is connected with one end of the pitman K, the other end of this pitman is by an oblique ascending line attached to an arm K rising vertically from an axis W sustained near midway between the uprights at that end of the frame which is near the bottom of the inclined plane, and gives this shaft or axis W an oscillating motion, which motion is communicated to two other arms, connecting in like manner with the axis; one arm T rises up to sieve B, and the other arm U, which descends to sieve C, which sieve shakes the broken garlic, and conveys the remainder down toward the lower part of said sieve C, when the current of fan wheel D separates it from the wheat. The fans F and D are put in motion by bands which run over pulleys G and H attached to shafts of boxes No. 2, and cogwheel between boxes Nos. 1 and 2 as above described.

Fig. 2 is back view of the framework. Fig. 4 is an end elevation of the machine, showing the oscillating axis, its arms, &c. Fig. 5 the box in which sieve C, is represented, and Fig. 6 the top view of the frame work, and in which sieve B, is represented.

What I claim as my invention is—

1. The mode of forming the concave with a series of plates placed obliquely as at 1, 2, 3, in Fig. 3, provided with teeth placed in an inverse direction to those on the wings of the boxes.

2. The combination of four boxes more or less provided with winged wheels and teeth as above described, and with toothed plates in the above form and arrangement, with an inclined plane, so that the garlic shall successively be acted on thus: after receiving the action of box number 1, the garlic that remains unbroken shall be subjected to the action of box No. 2; and that which remains unbroken from No. 2, shall be subjected to the action of No. 3; and that which remains unbroken from No. 3, shall be subjected to the action of No. 4.

3. The combination of sieves B, C, and L and fanwheels F and D with a series of boxes and cutters in the manner above arranged.

4. The combination of the cutters in box number 1, with fanwheel F, and sieve L, to cut and throw out the hull of the garlic, thus enabling the remaining cutters to cut or break the grains thereof without obstruction.

JOSEPH HEYGEL.

Witnesses:
  B. R. MOSSELL,
  B. A. THOM.